(12) United States Patent
Wu

(10) Patent No.: US 12,093,889 B2
(45) Date of Patent: Sep. 17, 2024

(54) METHOD, A DEVICE AND A SYSTEM FOR CHECKOUT

(71) Applicant: Yi Tunnel (Beijing) Technology Co., Ltd., Beijing (CN)

(72) Inventor: Yili Wu, Beijing (CN)

(73) Assignee: Yi Tunnel (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 16/764,086

(22) PCT Filed: Mar. 9, 2020

(86) PCT No.: PCT/CN2020/078470
§ 371 (c)(1),
(2) Date: May 14, 2020

(87) PCT Pub. No.: WO2021/179137
PCT Pub. Date: Sep. 16, 2021

(65) Prior Publication Data
US 2021/0398097 A1 Dec. 23, 2021

(51) Int. Cl.
*G06Q 10/08* (2024.01)
*G06Q 10/087* (2023.01)
(Continued)

(52) U.S. Cl.
CPC .......... *G06Q 10/087* (2013.01); *G06Q 20/20* (2013.01); *G06V 10/764* (2022.01); *G06V 10/82* (2022.01);
(Continued)

(58) Field of Classification Search
CPC .. G06Q 20/20; G06T 7/73; G06T 7/00; G06T 7/292; G06T 2207/30196;
(Continued)

(56) References Cited

U.S. PATENT DOCUMENTS 9,158,975 B2 * 10/2015 Lipton ............... G08B 13/1968
10,268,983 B2 * 4/2019 Kumar ................. G07G 1/0036
(Continued)

FOREIGN PATENT DOCUMENTS

CN 109409175 A 3/2019
CN 111222870 A 6/2020

OTHER PUBLICATIONS

Written Opinion of the International Searching Authority in International Application PCT/CN2020/078470, dated Dec. 7, 2020, 10 pages.

*Primary Examiner* — Florian M Zeender
*Assistant Examiner* — Milena Racic
(74) *Attorney, Agent, or Firm* — Modal PLLC

(57) ABSTRACT

The present invention discloses a method, a device and a system for checkout, and belongs to the technical field of vision identification. A checkout method comprises: acquiring an identity information of a purchaser; identifying a take-up action or a put-back action of the purchaser to acquire an action identification result, and items at which the take-up action or the put-back action aims to acquire an item identification result; and performing checkout based on the identity information, the action identification result, and the item identification result of the purchaser. A checkout device comprises: an acquisition module, an identification module and a checkout module. Another checkout device comprises: a shelf, a range sensor, an identity verification collection module, an identification image collection module, a processor and a memory. A checkout system comprises: a client terminal and the checkout device. According to the present invention, the selling procedure is friendly, and the customer's experience is good. A plurality of various items is available in one transaction, and the purchasing procedure is convenient and fast.

10 Claims, 3 Drawing Sheets

(51) Int. Cl.
*G06Q 20/20* (2012.01)
*G06V 10/764* (2022.01)
*G06V 10/82* (2022.01)
*G06V 20/40* (2022.01)
*G06V 20/52* (2022.01)
*G06V 40/16* (2022.01)
*G06V 40/20* (2022.01)

(52) U.S. Cl.
CPC .............. *G06V 20/40* (2022.01); *G06V 20/52* (2022.01); *G06V 40/172* (2022.01); *G06V 40/28* (2022.01); *G06V 20/44* (2022.01)

(58) Field of Classification Search
CPC . G06T 2207/20081; G06T 2207/10016; G06T 2207/10028; G06T 2207/30242; G06T 7/74; G06T 7/75; G06V 20/52; G06V 10/764; G06V 40/10; G06N 3/045; H04N 23/90; H04N 23/60
See application file for complete search history.

(56) References Cited

U.S. PATENT DOCUMENTS

| | | | |
|---|---|---|---|
| 10,783,491 B2* | 9/2020 | Buibas | G06T 17/00 |
| 10,789,720 B1* | 9/2020 | Mirza | G06T 7/246 |
| 10,950,099 B1* | 3/2021 | Schoner | G07G 1/0045 |
| 10,956,721 B2* | 3/2021 | Tusch | G06V 20/52 |
| 11,049,263 B2* | 6/2021 | Buibas | G01G 19/4144 |
| 11,417,082 B2* | 8/2022 | Zheng | G06K 9/6215 |
| 11,501,455 B2* | 11/2022 | Crain | G06T 7/292 |
| 11,823,459 B2* | 11/2023 | Sinha | G06V 20/52 |
| 2018/0218351 A1* | 8/2018 | Chaubard | G07G 1/0081 |
| 2019/0149725 A1* | 5/2019 | Adato | G06V 20/20 |
| | | | 348/158 |
| 2020/0019921 A1* | 1/2020 | Buibas | G01G 19/14 |
| 2020/0334835 A1* | 10/2020 | Buibas | G06V 20/64 |
| 2021/0183212 A1* | 6/2021 | Wen | G07G 1/0063 |
| 2021/0217017 A1* | 7/2021 | Scott | G06V 20/52 |
| 2022/0270199 A1* | 8/2022 | Rodriguez | G06T 1/0021 |

* cited by examiner

METHOD, A DEVICE AND A SYSTEM FOR CHECKOUT

CROSS-REFERENCE TO RELATED APPLICATIONS

This application is the U.S. National Phase of, and claims the benefit of priority from, PCT International Application No. PCT/CN2020/078470, filed on Mar. 9, 2020. The contents of that application are herein incorporated by reference in their entirety.

BACKGROUND

Field of Invention

The present invention belongs to the technical field of vision identification, and specifically relates to a method, a device and a system for checkout.

Background of the Invention

A selling machine (or called as a vending machine) does not need to be watched by a cashier and is convenient to sell an item, and thus it is very popular in relatively crowded areas, such as stations, shopping malls, hospitals and schools. The selling machine has the following selling procedure in which a customer selects an item of interest, touches a key corresponding to the item, and then completes the paying procedure by inputting a coin or paper money or using mobile payments, such as Alipay, WeChat and the like so as to get the item.

With the development of the information technology, an increasing number of customers feel that the selling procedure of the selling machine is unfriendly for failing to implement the checkout mode of "Just Walk Out" in which the customers can leave immediately after selecting an item. Moreover, the selling machine can only complete a transaction of one item each time. When the customers need to purchase a plurality of items, the transaction needs to be repeatedly carried out. Therefore, the purchasing procedure is inconvenient. Moreover, samples, instead of actual salable item, are placed on a shelf of the selling machine, and only one row of samples can be placed on the shelf. Hence, there are very few categories of items, and the demand of the customers for item diversification cannot be met.

SUMMARY

In order to solve the problem in the prior art. In one aspect, the present invention provides a checkout method comprising: step S1, acquiring an identity information of a purchaser; step S2, identifying a take-up action or a put-back action of the purchaser to acquire an action identification result, and items at which the take-up action or the put-back action aims to acquire an item identification result; and step S3, performing checkout based on the identity information of the purchaser, the action identification result, and the item identification result.

In the above-mentioned checkout method, preferably, acquiring the identity information of the purchaser specifically comprises: judging whether the distance between a target object and a range sensor comply with a preset threshold value or not; if it is judged to comply with the preset threshold value, the target object will be confirmed as the purchaser; and acquiring the identity information of the purchaser according to a acquired facial image of the purchaser.

In the above-mentioned checkout method, preferably, identifying the take-up action or the put-back action of the purchaser in the step S2 specifically comprises: acquiring a plurality of frames of consecutive hand images of the purchaser in front of a shelf bearing the items, and establishing a motion track of a hand for the plurality of frames of consecutive hand images on a timeline; identifying the action of the purchaser as the take-up action or the put-back action according to a movement direction of the motion track of a hand relative to the shelf.

In the above-mentioned checkout method, preferably, identifying the item at which the take-up action or the put-back action aims to acquire the item identification result in the step S2 specifically comprises: S21, acquiring a plurality of primary classification results, according to the acquired plurality of frames of hand images of the purchaser in front of the shelf bearing the items and a pre-trained first-level classification model, in which the pre-trained first-level classification model is a model that is constructed by an image identification technique of a convolutional neural network and trained by all the items on the shelf; S22, acquiring a first-level classification result according to the plurality of primary classification results and a pre-trained first-level linear regression model; and S23, obtaining the item identification result according to the first-level classification result.

In the above-mentioned checkout method, preferably, after the step S22, the checkout method further comprising: S24, judging whether the first-level classification result is a similar item or not; S25, acquiring a plurality of secondary classification results, according to the plurality of frames of hand images and a pre-trained second-level classification model, then acquiring a second-level classification result according to the plurality of secondary classification results and a pre-trained second-level linear regression model, and acquiring the item identification result according to the secondary classification result, in case that it is judged the similar item, in which the second-level classification model is a model that is constructed by the image identification technique of the convolutional neural network and pre-trained by all the similar items on the shelf in advance; and S26, if not, skipping to step S23.

In another aspect, the present invention further provides a checkout device comprising: an acquisition module used to acquire an identity information of a purchaser; an identification module used to identify a take-up action or a put-back action of the purchaser to acquire the action identification result, and items at which the take-up action or the put-back action aims to acquire an item identification result; and a checkout module connected with the acquisition module and the identification module, used to perform checkout according to the identity information, the action identification result, and the item identification result.

In the above-mentioned checkout device, preferably, the acquisition module comprises: a distance judgment unit used to judge whether the distance between a target object and a range sensor comply with a preset threshold value or not; a confirmation unit used to confirm the target object as the purchaser when the distance between the target object and the range sensor is judged to comply with the preset threshold value, and an acquisition unit used to acquire the identity information of the purchaser according to an acquired facial image of the purchaser.

In the above-mentioned checkout device, preferably, the identification module comprises: an action identification unit, used to acquire a plurality of frames of consecutive hand images of the purchaser in front of the shelf bearing the items, and establish a motion track of a hand for the plurality of frames of consecutive hand images on a timeline, and identify the action of the purchaser as the take-up action or the put-back action according to the movement direction of the motion track of a hand relative to the shelf; and an item identification unit, used to acquire a plurality of primary classification results, according to a acquired plurality of frames of hand images of the purchaser in front of the shelf bearing the items and a pre-trained first-level classification model, in which the pre-trained first-level classification model is a model that is constructed by an image identification technique of a convolutional neural network and trained by all the items on the shelf; acquire a first-level classification result according to the plurality of primary classification result and a pre-trained first-level linear regression model in advance; and acquire the item identification result according to the first-level classification result.

In the above-mentioned checkout device, preferably, the item identification unit is also used to, after acquiring the first-level classification result, judge whether the first-level classification result is a similar item or not, obtain a plurality of secondary classification results, according to the plurality of frames of hand images and a pre-trained second-level classification model, acquiring a second-level classification result according to the plurality of secondary classification results and a pre-trained second-level linear regression model, and acquiring item identification result according to the secondary classification result, in case that it is judged the similar item, in which the second-level classification model is a model that is constructed by the image identification technique of the convolutional neural network and pre-trained by the all the similar items on the shelf in advance; and if not, acquiring the item identification result according to the first-level classification result.

In still a further aspect, the present invention provides a checkout device, comprising: a shelf for bearing items; a range sensor arranged on the shelf, for generating a distance information between a target object and a range sensor; an identity verification collection module arranged on the shelf, for acquiring a facial image of the target object; an identification image collection module arranged on the shelf, for acquiring the hand image of the target object; a processor; and a memory that records processor-executable instructions, in which the processor is configured to acquire an identity information of a purchaser according to the distance information and the facial image, identify a take-up action or a put-back action of the purchaser to acquire an action identification result, and items at which the take-up action or the put-back action aims to acquire an item identification result according to the hand image sent by the identification image collection module, and perform checkout according to the identity information, the action identification result, and the item identification result of the purchaser.

In still a further aspect, the present invention provides a checkout system, comprising: a client terminal, used to receive an identity information inputted by a target object and send the identity information to a checkout device, and used to receive a shopping list produced by the checkout device; and the checkout device.

The examples of the present invention bring the following beneficial effects by the above-mentioned technical solutions.

The selling procedure is friendly, and the customer's experience is good. A plurality of various items are available in one transaction, and the purchasing procedure is convenient and fast.

DETAILED DESCRIPTION OF THE EMBODIMENTS

In order to make objects, technical solutions and advantages of the present invention more apparent, the embodiments of the present invention will be further described in detail below in connection with the drawings.

Figure 1:
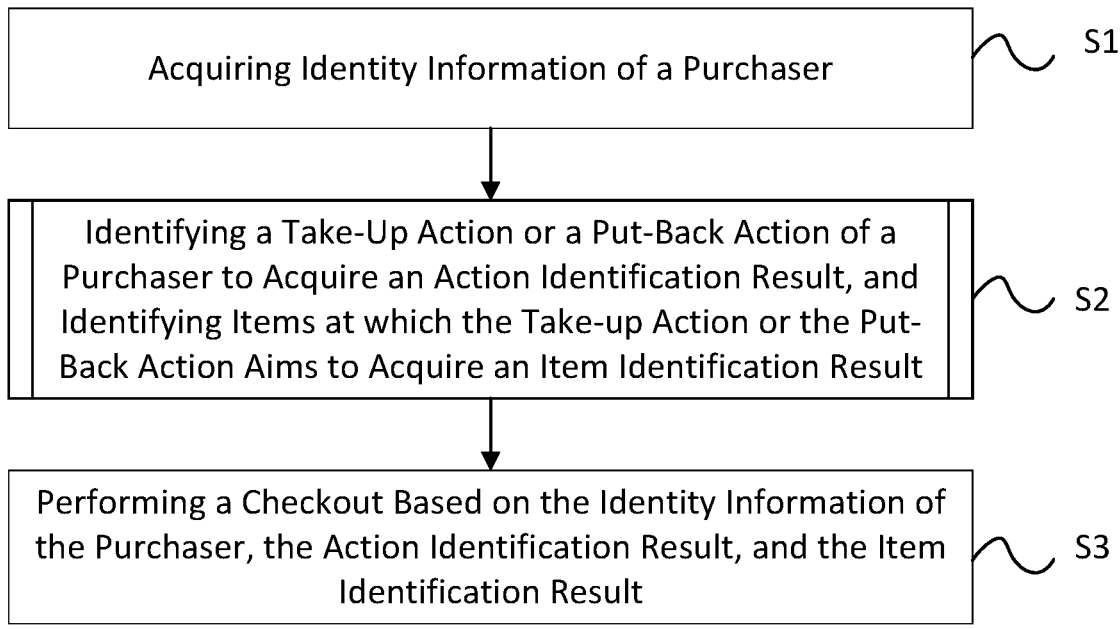
FIG. 1 is a schematic flowchart of a checkout method provided in an example of the present invention.

With reference to FIG. 1, an example of the present invention provides a checkout method. With reference to FIG. 1, the method comprises the following steps.

The step S1, acquiring an identity information of a purchaser;

Specifically, the implementation of the step comprises: judging whether the distance between a target object and a range sensor comply with a preset threshold value or not; if it is judged to comply with the preset threshold value, the target object will be confirmed as the purchaser. Then, acquiring facial image of the purchaser, and acquiring the identity information of the purchaser according to an acquired facial image of the purchaser. In particularly, the implementation is suitable for the scene of open unattended shopping, such as the office place of enterprise, that is, locking module does not need to be arranged on the shelf bearing the items. The locking module is usually arranged in the traditional method, and the purchaser can select items only when the locking control module is left open.

The range sensor can be an ultra-sonic range sensor, an infrared range sensor, or a radar sensor and the like. The preset threshold values such as 65 cm, 75 cm and the like are set, and the specific value can be selected according to the actual application conditions, which is not limited in the embodiment. Due to the position of the range sensor has a correlation with the position of the shelf bearing the items, that is, the distance between the target object and the shelf is characterized by the distance between the target object and the range sensor, for example, the range sensor is arranged on the shelf. When the target object wants to go shopping, and gradually approaches the range sensor, the range sensor generates distance information about the target object, which is compared to the preset threshold value by a processor described below. If it is consistent with the preset threshold value, the target object will be confirmed as the purchaser, and the identity verification collection module is started to acquire the facial image of the target object (or called as the purchaser at the moment); And if it is larger than the preset threshold value, the distance information will be compared with the preset threshold value continuously. Then, the facial image of the purchaser is identified to confirm the identity information of the purchaser. Before the application, the facial image of the target object in the application scene needs to be collected, which can be collected by the following client terminal.

The step S2, identifying the take-up action or the put-back action of the purchaser to acquire an action identification result, and the items at which the take-up action or the put-back action aims to acquire the item identification result.

Specifically, after confirming the identity information of the purchaser, the take-up action or the put-back action is associated with the purchaser so as to know which purchaser performs the take-up action or the put-back action on items, that is, which purchaser wants to purchase the items. After identifying the take-up action or the put-back action and what the items at which the take-up action or the put-back action aims, a shopping list (or called as a virtual shopping cart) corresponding to the purchaser can be generated. The item is correspondingly augmented from the shopping list of the customer, when the item is applied the take-up action by the customer, and the item is correspondingly subtracted from the shopping list, when the item is applied the put-back action by the customer. That is, the shopping list is updated in real time according to the take-up action or the put-back action of the customer.

A sub step in this step, the embodiment for identifying the take-up action or the put-back action of the purchaser to acquire an action identification result comprises: acquiring a plurality of frames of consecutive hand images of the purchaser in front of the shelf bearing the items, and establishing a motion track of a hand for the plurality of frames of consecutive hand images on a timeline; identifying the action of the purchaser as the take-up action or the put-back action according to the movement direction of the motion track of a hand relative to the shelf.

An identification image collection module, such as a camera, is deployed at the upper portion of a door frame of the shelf and a shooting angle thereof is downward, so that the shooting range thereof covers the front area of the shelf, which is beneficial for shooting the hand image of the customer. The camera can shoot a plurality of frames of images per second, e.g., 30 frames. The hand images of the purchaser captured by the camera are detected frame by frame. The position of the hand in each frame of hand image is marked and saved. The above-mentioned operations are repeated for every frame. In this way, one motion track of the hand can be obtained on the timeline. Not only the position of the hand in each frame of image can be obtained, but also whether the item is taken in the hand can be judged and a category of the item can be confirmed according to a certain frame of hand image. In order to ensure that the hand image is shot and ensure an accuracy of identifying the item, the identification image collection module is arranged at the lower portion of the door frame, and the shooting angle thereof is upward. In order to improve the identify accuracy, the number of each identification image collection module is multiple, such as two. In practical application, two identification image collection modules can be arranged diagonally on the shelf, at the moment, the shooting angle of one identification image collection module is obliquely downward, and the shooting angle of the other identification image collection module is obliquely upward.

A virtual action boundary is marked in the hand image, which is spaced a certain distance, e.g., 8 cm or 12 cm from the shelf. In case that it is detected that the motion track of the hand is a movement from a position away from the shelf through the action boundary to a position close to the shelf, briefly, a movement from the outside of the action boundary to the inside of the action boundary, and the item is taken in the hand, then it is considered that the hand action is the put-back action on the item; and in case that it is detected that the motion track of the hand is a movement from a position close to the shelf through the action boundary to a position away from the shelf, briefly, a movement from the inside of the action boundary to the outside of the action boundary, and the item is taken in the hand, then it is considered that the hand action is the take-up action on the item.

The camera continuously captures video data, shoots a plurality of frames of hand images per second, such as dozens of frames. One frame of hand image at an interval of one second can be obtained, so as to cut out a hand position, and classify (or called as identify) the item in the hand. This can be implemented by a pre-trained classification model described below.

Figure 2:
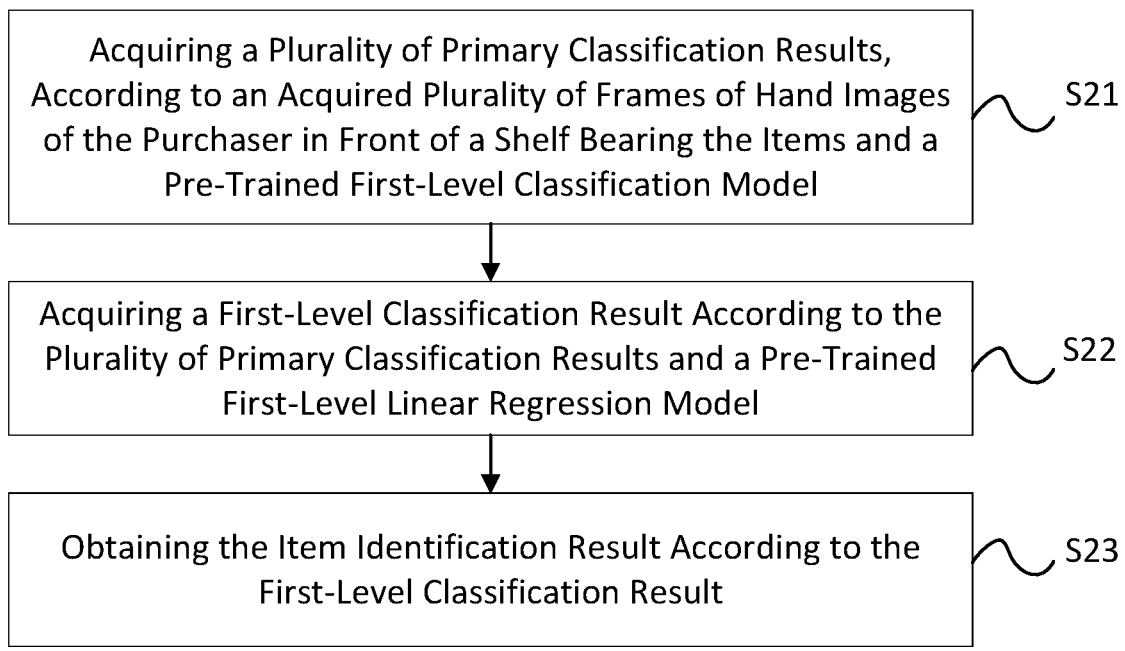
FIG. 2 is a schematic flowchart of an item identification method provided in an example of the present invention.

With reference to FIG. 2, a method for performing identification on the item at which the take-up action or the put-back action aims can adopt the following steps.

S21, acquiring a plurality of primary classification results according to the acquired plurality of frames of hand images of the purchaser in front of the shelf bearing the items and a pre-trained primary classification model;

Specifically, carrying out each frame the target detection on hand image containing item to mark out a target area corresponding to the item on the hand image. The image corresponding to the target area can be referred to as a target area image. The shape of the target area can be rectangular, circular. The acquisition of the plurality of frames of hand images may be from one identification image collection module as described below, or from the plurality of identification image collection modules as described below, such as two, which is not limited in the embodiment.

The pre-trained first-level classification model is a model that is constructed by an image identification technique of convolutional neural network and trained by all items on the shelf. The trained first-level classification model classifies the items in each target area image to obtain the primary classification result. The primary classification result is an n-dimensional vector, wherein n represents the total number of items on the shelf. Each element in the vector represents a probability that the to-be-classified item belongs to each of the n items according to the first-level classification model. When the element has a maximum value in the vector, it means that the to-be-classified item is an item corresponding to the element according to the model. When the number of frame is 5, the number of the primary classification result is 5 n-dimensional vectors.

When the first-level classification model is trained, data are collected in advance to establish a data set, and the collection of the data comprises, but not limit to: 1) shooting all items on the shelf from each angle and in each attitude to acquire a great amount of photos; and 2) labeling those photos, i.e., labeling positions, sizes and categories of the items in the photos. The data included in the data set means the above-mentioned photos and labels on those photos. The first-level classification model is a model constructed by an image identification technique of convolutional neural network, and is trained by using the data of all items on the shelf. The training can be carried out in a gradient descent mode.

S22, acquiring a first-level classification result according to the plurality of primary classification results and a pre-trained first-level linear regression model.

Specifically, when the first-level classification model is trained, the primary classification result outputted by the first-level classification model is used as input of the first-level linear regression model, and correct classifications of the items included in the hand image corresponding to the primary classification result is used as output of the first-level linear regression model, so as to train the first-level linear regression model. The trained first-level linear regression model carries out data fusion on the plurality of primary classification results to obtain one first-level classification result. The first-level classification result represents that the first-level linear regression model predicts to which category of item on the shelf the item in the image belongs.

S23, obtaining an item identification result according to the first-level classification result, that is, determining the first-level classification result as the item identification result.

Figure 3:
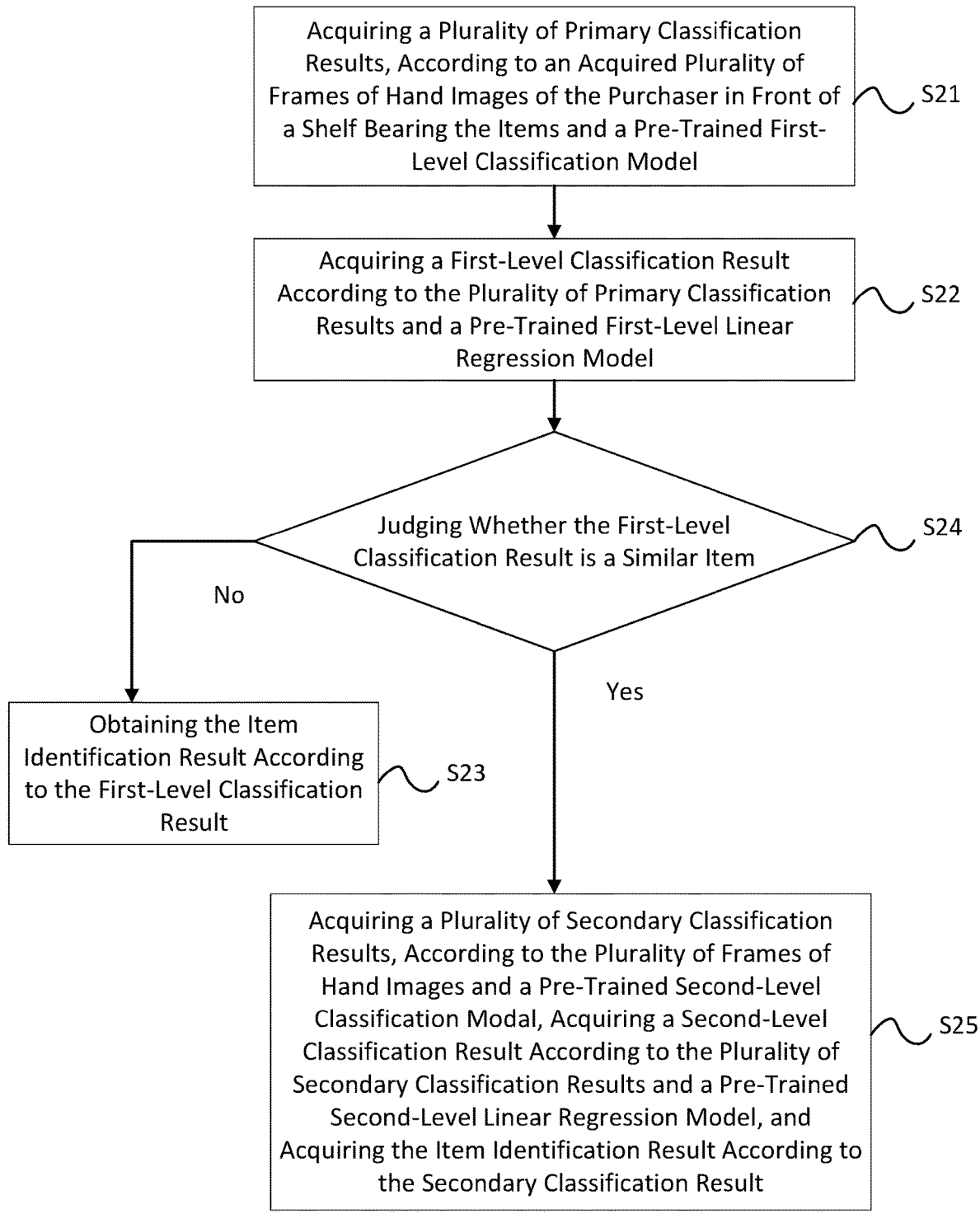
FIG. 3 is a schematic flowchart of another item identification method provided in an example of the present invention.

There are various items on the shelf. Among the various items, there may be some items which are similar in appearance and may easily be visually confused. Such items are called as similar items. If a single to-be-classified item is a similar item, the first-level classification model is difficult to accurately classify the items. For example, confusing two items of similar items with each other. Thus, with reference to FIG. 3, after the step S22, the following step S24 needs to be executed to judge whether the first-level classification result is the similar item or not, if yes, a step S25 is executed, otherwise, a step S26 is executed, i.e. skipping to the step S23.

The step S25, if the first-level classification result is the similar item, a plurality of secondary classification results are acquired according to the plurality of frames of hand images and a pre-trained second-level classification model, then a second-level classification result is acquired according to the plurality of secondary classification results and a pre-trained second-level linear regression model, the item identification result is obtained according to the second-level classification result. The second-level classification model is a model that is constructed by the image identification technique of convolutional neural network and trained by all the similar items on the shelf.

Specifically, the second-level classification model is trained by utilizing data of the similar item in the data set established in the step S22, and the training can be carried out in a gradient descent mode. The second-level classification model differs from the first-level classification model in that different data are used in the training process, in which the data used by the first-level classification model are data of all the items in the shopping place, and the data used by the second-level classification model are the data of the similar items in the accommodating case.

The trained second-level classification model classifies the items in each the above-mentioned plurality of target area images to obtain the secondary classification result. The secondary classification result is also a m-dimensional vector, and each element in the vector represents a probability that the single to-be-classified item belongs to each of m similar items according to the second-level classification model.

When the target area image is 5, the number of the secondary classification result is 5 m-dimensional vectors, wherein m is smaller than or equal to n and represents the total number of the similar items on the shelf.

When the second-level classification model is trained, the secondary classification result outputted by the second-level classification model are used as inputs of the second-level linear regression model, and correct classifications of the items included in the images corresponding to the secondary classification result are used as outputs of the second-level linear regression model, so as to train the second-level linear regression model. The trained second-level linear regression model carries out data fusion on the plurality of secondary classification results to acquire one second-level classification result, and the second-level classification result is used as an item identification result. The second-level classification result indicates which of all the items on the shelf item in the image is predicted by the secondary linear regression model.

The step S3, performing checkout based on the identity information, the action identification result, and the item identification result of purchaser.

Specifically, identifying the shopping conditions of the purchaser, that is selecting which items to be purchased after the identity information of the purchaser is obtained, then, querying prices corresponding to the item and obtaining payment charges required by the purchaser to generate a checkout list corresponding to the purchaser, and performing checkout according to the checkout list. It can be debited to the purchaser by the payment account number uploaded from the client terminal described below to the checkout device described below at the time of checkout. The payment account number can be a bank account number, and a third-party account number, such as an Alipay number, a Tenpay number and the like.

The examples of the present invention make the selling procedure friendly, and the customer's experience good; purchase of a plurality of various items in one transaction available, and the purchasing procedure convenient and fast by acquiring an identity information of a purchaser, identifying the take-up action or the put-back action of the purchaser to acquire an action identification result, and the item at which the take-up action or the put-back action aims to acquire an item identification result, and then performing checkout based on the identity information, the action identification result, and the item identification result of purchaser.

Figure 4:
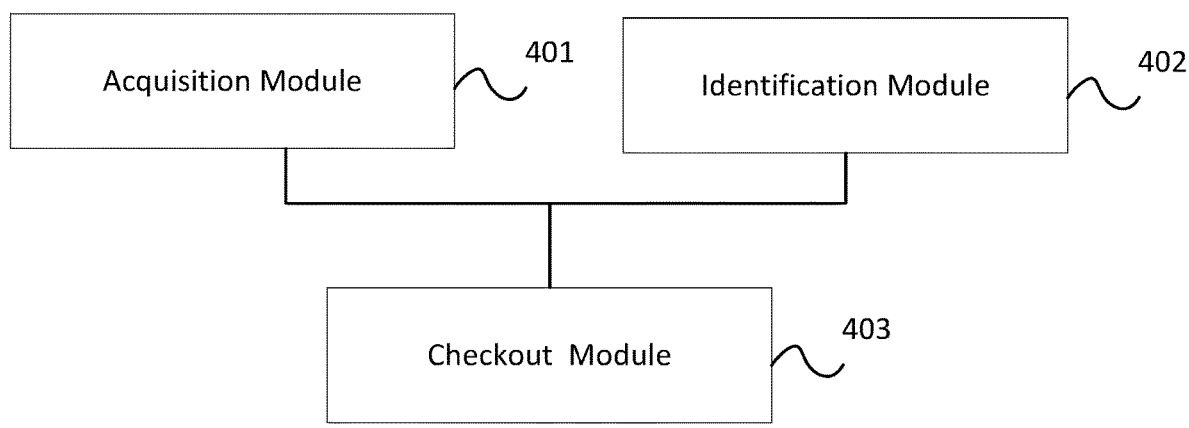
FIG. 4 is a structural schematic diagram of a checkout device provided in an example of the present invention.

With reference to FIG. 4, another example of the present invention provides a checkout device, comprising: an acquisition module 401, an identification module 402, and a checkout module 403.

Wherein the acquisition module 401 is used to acquire an identity information of the purchaser; an identification module 402 is used to identify a take-up action or a put-back action of the purchaser to acquire an action identification result, and the item at which the take-up action or the put-back action aims to acquire an item identification result; and the checkout module 403 is connected with the acquisition module and the identification module and used to perform checkout based on the identity information, the action identification result, and the item identification result of purchaser.

Preferably, the acquisition module comprises: a distance judgment unit used to judge whether the distance between a target object and a range sensor comply with a preset threshold value or not; a confirmation unit used to confirm the target object as the purchaser when the distance between the target object and the range sensor is judged to comply with the preset threshold value, and an acquisition unit used to acquire the identity information of the purchaser according to a acquired facial image of the purchaser.

Preferably, the identification module comprises: an action identification unit used to acquire a plurality of frames of consecutive hand images of the purchaser in front of the shelf bearing the items, and establishing a motion track of a hand for the plurality of frames of consecutive hand images on a timeline; identify the action of the purchaser as the take-up action or the put-back action according to the movement direction of the motion track of a hand relative to the shelf; and an item identification unit used to acquire a plurality of primary classification results, according to the acquired plurality of frames of hand images of the purchaser in front of the shelf bearing the items and a pre-trained first-level classification model, in which the pre-trained first-level classification model is a model that is constructed by an image identification technique of a convolutional neural network and trained by all the items on the shelf; acquire a first-level classification result according to the plurality of primary classification results and a pre-trained first-level linear regression model; and acquire the item identification result according to the first-level classification result.

Preferably, the item identification unit is also used to, after acquiring a first-level classification result, judge whether the first-level classification result is a similar item or not, obtaining a plurality of secondary classification results, according to the plurality of frames of hand images and a pre-trained second-level classification model, then, acquiring a second-level classification result according to the plurality of secondary classification results and a pre-trained second-level linear regression model, and acquiring the item identification result according to the second-level classification result, in case that it is judged the similar item, in which the second-level classification model is a model that is constructed by the image identification technique of the convolutional neural network and pre-trained by all the similar items on the shelf in advance; and if not, acquiring the item identification result according to the first-level classification result.

It should be noted that the specific description on the acquisition module 401, the identification module 402, and the checkout module 403 can refer to the corresponding contents of the steps S1-S3 and the steps S21-S26 in the above-mentioned example, which are not repeated herein.

Another example of the present invention provides a checkout device, comprising: a shelf, a range sensor, an identity verification collection module, an identification image collection module, a processor, and a memory.

The shelf is used for bearing the items. The range sensor is arranged on the shelf and generates the distance information between a target object and a range sensor. The identity verification collection module is arranged on the shelf and acquires the facial image of the target object. The identification image collection module is arranged on the shelf and acquires the hand image of the target object. The processor. The memory that records processor-executable instructions, in which the processor is configured to acquire the identity information of the purchaser according to the distance information and the facial image, identify the take-up action or the put-back action of the purchaser to acquire an action identification result, and the item at which the take-up action or the put-back action aims to acquire an item identification result according to the hand image sent by the identification image collection module, and perform checkout according to the identity information, the action identification result, and the item identification result of purchaser. Both the identity verification collection module and the identification image collection module can be cameras.

In order to improve identification efficiency, the processor comprises: a local processor unit and a remote processor unit. Both the local processor unit and the remote processor unit can be configured as performing function of the above-mentioned processor. In practical application, the local processor unit processes or the remote processor unit processes can be selected according to the signal intensity when the checkout device is applied. For example, judging whether the signal intensity is lower than the preset threshold value or not. If yes, selecting the local processor unit for processing, otherwise, selecting the remote processor unit for processing.

In order to remind the purchaser about the selected item information timely, the checkout device further comprises: a display for displaying the shopping list which include but not limited to item name, number, and price.

In order to improve the safety of the checkout device, the identity verification collection module acquires images of the surrounding environment of the shelf in real time, and the processor identifies the images acquired by the identity verification collection module when the distance between the target object and the range sensor accords with the preset threshold value.

Preferably, the shelf comprises: a shelf body and a rack. The shelf body is used for providing a placing space for items. The rack is arranged in the shelf body and used for providing a placing position for the items. Preferably, there are a plurality of racks, which are arranged in a rack body in parallel to divide the rack body into a plurality of independent spaces from top to bottom; The each shelf comprises: a transverse plate and a vertical plate connected to the end of the transverse plate, wherein the transverse plate is used for placing the items, and the vertical plate is used for preventing the items from falling.

In order to enable the shelf to store and protect items conveniently, and display the content of the items conveniently, a perforated plates are enclosed on the left side, the right side and the rear side of the shelf body to protect the items in the shelf body and prevent the items from falling from the shelf body.

In order to reduce the error rate when checking out, the shelf further comprises guardrails, which are arranged on the perforated plates on the left side and the right side of the shelf body. The guardrail is movably connected with the perforated plate in a manner that the pulley is connected with the sliding rail, and can be pulled out from a left side wall and a right side wall of the perforated plate. By installing the guardrails, not only the purchaser can be isolated from irrelevant pedestrians, and the privacy in the shopping process of a buyer can be protected, but also a plurality of the purchasers can be queued for purchase, so that the errors caused by misjudgment of the utility model are reduced, and the present utility model has the characteristics of low error rate and convenience in privacy protection.

Still a further embodiment of the present invention provides a checkout system. The checkout system comprises: a client terminal and a checkout device. The client terminal is used to receive identity information inputted by the target object and send the identity information to the checkout device, and used to receive a shopping list issued by the checkout device. The checkout device is the above-mentioned checkout device.

From the above, the embodiments of the present invention bring the following beneficial effects.

The selling flow is friendly, and the customer's experience is good. A plurality of various items can be purchased in one transaction, and the purchasing procedure is convenient and fast.

It can be known from common technical knowledge that the present invention can be implemented by other embodiments without departing from the spirit essence or necessary characteristics of the present invention. Therefore, the above-mentioned disclosed embodiments, in all aspects, merely are used for illustration rather than limitation. All changes made in the scope of the present invention or the scope equivalent to the present invention shall fall within the present invention.

What is claimed is:

1. A checkout method comprising:
acquiring identity information of a purchaser;
acquiring a plurality of frames of consecutive hand images of a take-up action or a put-back action of items of the purchaser's hand of the purchaser in front of a shelf bearing items with an identification image collection module, and establishing a motion track of a hand for the plurality of frames of consecutive hand images on a timeline, the identification image collection module arranged on the shelf for bearing items;
identifying the take-up action or the put-back action of the purchaser according to a movement direction of the motion track of a hand relative to the shelf to acquire an action identification result, and identifying an item at which the take-up action or the put-back action aims to acquire an item identification result;
performing a checkout based on the identity information of the purchaser, the action identification result, and the item identification result,
wherein the said identifying the take-up action or the put-back action of the purchaser to acquire an action identification result includes:
acquiring a plurality of primary classification results according to an acquired plurality of frames of hand images of the purchaser in front of the shelf bearing the items and a pre-trained first-level classification model, in which the pre-trained first-level classification model is a model that is constructed by an image identification technique of a convolutional neural network and trained by all the items on the shelf; and
acquiring a first-level classification result according to the plurality of primary classification results and a pre-trained first-level linear regression model,
after the acquiring the first-level classification result, judging whether the first-level classification result is a similar item;
in a case that the first-level classification result is judged to be the similar item, acquiring a plurality of secondary classification results, according to the plurality of frames of hand images and a pre-trained second-level classification model, then acquiring a second-level classification result according to the plurality of secondary classification results and a pre-trained second-level linear regression model, and acquiring the item identification result according to the second-level classification result, in which the second-level classification model is a model that is constructed by the image identification technique of the convolutional neural network and pre-trained by all similar items on the shelf in advance; and
if the first-level classification result is judged not a similar item, obtaining the item identification result according to the first-level classification result,
wherein the acquiring the identity information of the purchaser includes
judging whether a distance between a target object and a range sensor comply with a preset threshold value, the range sensor arranged on the shelf, the distance between the target object and the shelf characterized by the distance between the target object and the range sensor,
if the distance is judged to comply with the preset threshold value, confirming the target object as the purchaser, and
acquiring the identity information of the purchaser according to an acquired facial image of the purchaser.

2. The checkout method according to claim 1, wherein the identification image collection module is arranged on a lower portion of a door frame of the shelf, and the shooting angle of the identification image collection module is upward.

3. The checkout method according to claim 1, further comprising:
acquiring another hand image of the target object with another identification image collection module arranged on the shelf.

4. The checkout method according to claim 3, wherein the identification image collection module and the other identification image collection module are arranged diagonally on the shelf.

5. A checkout device comprising:
a camera for acquiring a plurality of frames of consecutive hand images of a take-up action or a put-back action of items of a purchaser's hand of a purchaser in front of a shelf bearing items, and establishing a motion track of a hand for the plurality of frames of consecutive hand images on a timeline, the camera arranged on the shelf for bearing items; and
a processor configured
to acquire identity information of a purchaser;
to identify the take-up action or the put-back action of the purchaser to acquire an action identification result, and to identify an item at which the take-up action or the put-back action aims to acquire an item identification result;
to acquire a plurality of primary classification results according to an acquired plurality of frames of hand images of the purchaser in front of the shelf and a pre-trained first-level classification model, in which the pre-trained first-level classification model is a model that is constructed by an image identification technique of a convolutional neural network and trained by all the items on the shelf; and
to acquire a first-level classification result according to the plurality of primary classification results and a pre-trained first-level linear regression model;
after the acquiring the first-level classification result, the processor is further configured to judge whether the first-level classification result is the similar item;
in a case that the first-level classification result is judged to be the similar item, the processor is further configured to acquire a plurality of secondary classification results according to the plurality of frames of hand images and a pre-trained second-level classification model, then to acquire a second-level classification result according to the plurality of secondary classification results and a pre-trained second-level linear regression model, and acquire the item identification result according to the second-level classification result, in which the second-level classification model is a model that is constructed by the image identification technique of the convolutional neural network and pre-trained by all similar items on the shelf in advance; and
if the first-level classification result is judged not a similar item, the processor is further configured to obtain the item identification result according to the first-level classification result; and to perform a checkout according to the identity information, the action identification result, and the item identification result, wherein the acquiring the identity information of the purchaser includes judging whether a distance between a target object and a range sensor comply with a preset threshold value, the range sensor arranged on the shelf, the distance between the target object and the shelf characterized by the distance between the target object and the range sensor, if the distance is judged to comply with the preset threshold value, confirming the target object as the purchaser, and acquiring the identity information of the purchaser according to an acquired facial image of the purchaser.

6. The checkout device according to claim 5, wherein the processor further is configured to:

acquire a plurality of frames of consecutive hand images of the purchaser in front of the shelf bearing the items, establish a motion track of a hand for the plurality of frames of consecutive hand images on a timeline, and identify an action of the purchaser as the take-up action or the put-back action according to a movement direction of the motion track of the hand relative to the shelf.

7. A checkout system comprising:
a client terminal, to receive the identity information inputted by the target object and send the identity information to the checkout device, and to receive a shopping list produced by the checkout device; and
the checkout device according to claim 6.

8. A checkout system comprising:
a client terminal, to receive the identity information inputted by the target object and send the identity information to the checkout device, and to receive a shopping list produced by the checkout device; and
the checkout device according to claim 5.

9. A checkout device comprising:
a shelf for bearing items;
a range sensor arranged on the shelf, for generating distance information between a target object and the range sensor;
an identity verification collection module arranged on the shelf, for acquiring a facial image of the target object;
an identification image collection module arranged on the shelf, for acquiring a plurality of frames of consecutive hand images of a purchaser;
a processor; and
a memory that records processor-executable instructions, in which
the processor is configured to
acquire identity information of a purchaser according to the distance information and the facial image,
identify a take-up action or a put-back action of the purchaser to acquire an action identification result, and identify an item at which the take-up action or the put-back action aims to acquire an item identification result according to the hand image sent by the identification image collection module, to acquire a plurality of primary classification results according to the hand images and a pre-trained first-level classification model, in which the pre-trained first-level classification model is a model that is constructed by an image identification technique of a convolutional neural network and trained by all the items on the shelf; and to acquire a first-level classification result according to the plurality of primary classification results and a pre-trained first-level linear regression model;

after the acquiring the first-level classification result, the processor is further configured to judge whether the first-level classification result is the similar item, in a case that the first-level classification result is judged to be the similar item, the processor is further configured to acquire a plurality of secondary classification results according to the plurality of frames of hand images and a pre-trained second-level classification model, then to acquire a second-level classification result according to the plurality of secondary classification results and a pre-trained second-level linear regression model, and acquire the item identification result according to the second-level classification result, in which the second-level classification model is a model that is constructed by the image identification technique of the convolutional neural network and pre-trained by all similar items on the shelf in advance, and if the first-level classification result is judged not a similar item, the processor is further configured to obtain the item identification result according to the first-level classification result; and perform a checkout according to the identity information, the action identification result, and the item identification result of the purchaser, wherein the acquiring the identity information of a purchaser according to the distance information and the facial image includes judging whether a distance between a target object and the range sensor comply with a preset threshold value, the distance between the target object and the shelf characterized by the distance between the target object and the range sensor, and, if the distance is judged to comply with the preset threshold value, confirming the target object as the purchaser.

10. A checkout system comprising:
a client terminal, to receive the identity information inputted by the target object and send the identity information to the checkout device, and to receive a shopping list produced by the checkout device; and
the checkout device according to claim 9.

* * * * *